F. N. JORDAN.
LAWN TRIMMER.
APPLICATION FILED NOV. 10, 1916.
1,218,669.
Patented Mar. 13, 1917.
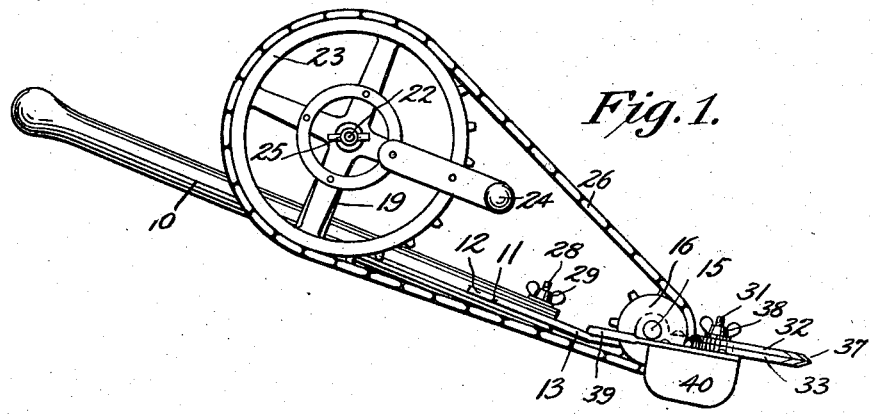
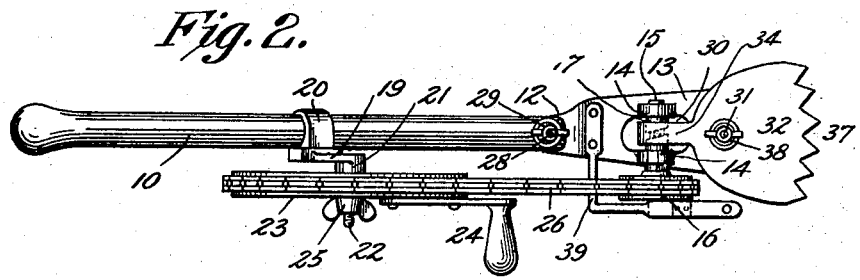
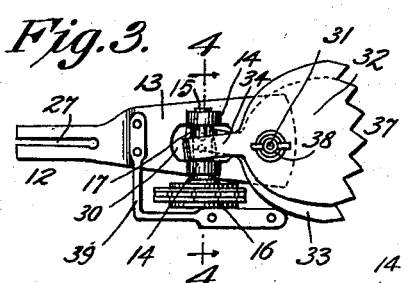
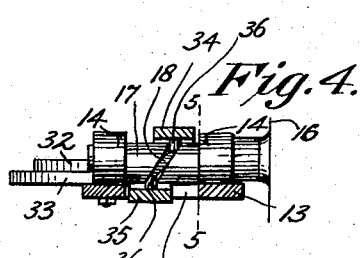
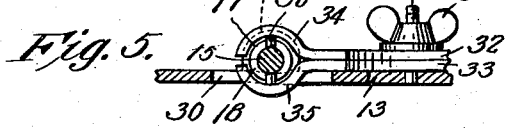
WITNESSES
INVENTOR
Frank N. Jordan,
BY
ATTORNEY

UNITED STATES PATENT OFFICE.

FRANK N. JORDAN, OF ST. JOHN, NEW BRUNSWICK, CANADA.

LAWN-TRIMMER.

1,218,669.  Specification of Letters Patent.  Patented Mar. 13, 1917.

Application filed November 10, 1916. Serial No. 130,606.

*To all whom it may concern:*

Be it known that I, FRANK N. JORDAN, a subject of the King of Great Britain, residing at St. John, in the Province of New Brunswick and Dominion of Canada, have invented certain new and useful Improvements in Lawn-Trimmers, of which the following is a specification.

This invention relates to a clipping implement and has for its object to provide a simple, strong and convenient tool for cutting and trimming grass around the edge of a lawn, a walk, monuments, and wherever the conditions are such as to render the use of a lawn mower impossible.

Another object of the invention is to provide an implement of this kind with means for actuating cutting knives whereby grass may be trimmed quickly and without trouble close against a wall or obstruction of any sort and in straight or curved lines as may be desired and furthermore to provide said implements with means for causing the cutting knives to move in opposite directions at any desired speed for the purpose of producing clean and rapid cutting.

Other objects of the invention not hereinabove recited but which form part of this invention will be fully set forth in the following specification, pointed out in the appended claims, and illustrated in the accompanying drawings, in which:—

Figure 1 is a view in side elevation of the complete implement in position for use;

Fig. 2 is a top plan view of the same;

Fig. 3 is a plan view of the cutting end of the implement with the knives in a different position from that shown in Fig. 2;

Fig. 4 is an enlarged vertical sectional view on the line 4—4 of Fig. 3; and

Fig. 5 is an enlarged detail view in section on the line 5—5 of Fig. 4.

In the drawings, 10 indicates a straight handle of any convenient length for supporting the implement and by means of which it is manipulated. At its lower end the handle 10 is slotted as at 11 to receive the forked end 12 of a carrying plate 13 on the upper side of which are mounted two bearings 14 in which is journaled a shaft 15 provided on its outer end with a sprocket wheel 16. Between the bearings, 14 the shaft 15 carries a barrel 17 in which is formed a cam groove 18 for a purpose to be hereinafter described.

At any convenient point on the handle 10 is attached a bracket 19 secured to said handle by a yoke 20. The free end of the bracket preferably extends upwardly a short distance from the handle 10 and terminates in a bearing 21 from which projects a stem 22 that carries a sprocket wheel 23 provided with a handle 24 by means of which the sprocket wheel is rotated. The outer end of the stem 22 is threaded for a thumb nut 25 by means of which the sprocket wheel 23 is held on the stem. A sprocket chain 26 passes around the sprocket wheel 23 and sprocket pinion 16 on the shaft 15 and when the sprocket wheel is rotated by means of the handle 24 the shaft 16 is caused to turn very rapidly because of the difference in size of the sprockets 23 and 16.

The forked end 12 of the supporting plate 13 has a longitudinal slot 27 extending inwardly from the end and through said slot and the lower end of the handle 10 there passes a fastening bolt 28 threaded on one end to receive a thumb nut 29 by means of which the slotted lower end of the handle 10 is clamped upon the plate 13 and securely fastened thereto but which when the nut is loosened may be moved endwise of one another to loosen or tighten the chain 26 or to separate the parts when it is desired to dismount the implement.

The supporting plate 13 may be perfectly flat or as illustrated in Fig. 1 be bent midway of its length to form a slight upward inclination at its forward end which forward end extends beyond the bearing 14 with a slight lateral spread as it advances. Between the bearings 14 the plate is cut away as at 30 to form an elongated longitudinal slot, while near the forward end of said plate in the longitudinal center is mounted a bolt 31 that projects upwardly through the plate 13 and pivotally supports a pair of cutting blades 32 and 33. Each blade is substantially semi-circular in plan view, the semi-circular portion being directed rearwardly and from which projects an arm for rocking the knife about the pivot pin 31. The upper knife blade 32 has an arm 34 that extends radially toward the drum 17 and before reaching the same curves upwardly and over the top of said drum, an arm 35 on the lower blade 33 curves in a similar manner below the drum. From each arm there projects a pin 36 into the cam groove 18 formed in the drum 17 so that when the shaft 15 is rotated the drum or barrel 17 also turns and through the cam groove 18 the knives 32 and 33 are rapidly oscillated in opposite directions. The forward edges of the knife blades are serrated as at 37 and sharpened to form sawlike cutting edges on the knife blades which edges may be straight or preferably curved as shown. A thumb nut 38 is screwed on the pivot pin 31 to hold the knife blade plates 32 and 33 in close contact.

Riveted to the upper side of the plate 15 a short distance in advance of the handle 10 is an arm 39 that extends laterally from said plate to a point beyond the sprocket wheel 16 where it is given a right angular turn in a forward direction and extends to a point about in line with the forward end of the blade 13. The forward end of the arm 39 is flattened on its upper and lower side and to the under side is riveted a vertical plate 40, the lower end of which bears upon the ground and forms a runner by means of which the cutting edges 37 of the knives are maintained at a constant distance from the ground.

In using the implement, the upper end of the handle is grasped in the left hand and with the runner 40 on the ground, the implement is pushed forward thereover, being guided in its direction of movement by the left hand, the right hand in the meantime turning the sprocket wheel 23 to operate the knives 32 and 33, the speed of cutting being governed by the rapidity with which the gearing is driven. The cam groove 18 in the drum 17 is of such shape that each knife makes a complete oscillation with every rotation of the drum. The arms 34 and 35 clearing the drum sufficiently to permit free oscillation without contacting therewith, the lower arm 26 extending downwardly into the slot 30 in the blade 13. The implement may be disassembled at any time desired by unscrewing the thumb nuts 25, 29 and 38 whereupon the several parts may be disconnected from their mountings.

What is claimed is:—

1. In a lawn trimmer, a supporting plate and a handle removably connected to said plate, a cam journaled in bearings carried by said plate, a bracket mounted on said handle, driving means for said cam carried by said bracket, a pair of coöperating cutter blades pivotally mounted on the supporting plate, a rearwardly extending arm on each of said blades engaging said cam for oscillating said blades, and a runner for upholding the supporting blade.

2. In a lawn trimmer comprising a supporting plate, a handle removably connected to said supporting plate, a horizontal shaft journaled on said supporting plate, a drum having a cam groove therein carried by said shaft, a pair of coöperating cutting blades pivotally mounted on the supporting plate in advance of said shaft, a rearwardly projecting arm on each of said cutting blades having means to engage said cam for the purpose of oscillating said blades, driving means carried by said handle and connected to said shaft for rotating the cam, and a supporting runner for the forward end of the implement.

3. In a lawn trimmer, the combination with a supporting plate having a rearwardly projecting forked end, an operating handle removably and adjustably connected to said forked end, a bracket carried by said handle, a sprocket wheel rotatably mounted on said bracket, a shaft journaled on said supporting plate, a sprocket wheel on said shaft and a chain for driving the same from the sprocket wheel carried by the handle, a cam also fixed on said shaft, a pair of coöperating cutting blades pivotally mounted on said supporting plate in advance of the shaft, and an arm projecting rearwardly from each of said blades and engaging the cam for oscillating the blades.

In testimony whereof I affix my signature in presence of two witnesses.

FRANK N. JORDAN.

Witnesses:
 BOWEN S. SMITH,
 WILLIAM A. EWING.

Copies of this patent may be obtained for five cents each, by addressing the "Commissioner of Patents, Washington, D. C."